(12) United States Patent
Lee et al.

(10) Patent No.: US 8,143,337 B1
(45) Date of Patent: Mar. 27, 2012

(54) METHOD OF PREPARING A COMPOSITE WITH DISPERSE LONG FIBERS AND NANOPARTICLES

(75) Inventors: L. James Lee, Columbus, OH (US); Gang Zhou, Columbus, OH (US); Xia Cao, Arlington, MA (US)

(73) Assignee: The Ohio State University, Columbus, OH (US)

( * ) Notice: Subject to any disclaimer, the term of this patent is extended or adjusted under 35 U.S.C. 154(b) by 1505 days.

(21) Appl. No.: 11/550,575

(22) Filed: Oct. 18, 2006

Related U.S. Application Data

(60) Provisional application No. 60/727,723, filed on Oct. 18, 2005.

(51) Int. Cl.
*C08K 3/34* (2006.01)

(52) U.S. Cl. ............ 524/445; 264/257; 521/61; 522/71; 522/78; 524/493; 524/494; 524/495

(58) Field of Classification Search .................. 264/45.1, 264/257; 521/61; 524/445, 495, 496, 493, 524/494; 522/71, 78
See application file for complete search history.

(56) References Cited

U.S. PATENT DOCUMENTS

| | | | |
|---|---|---|---|
| 3,615,384 A | 10/1971 | Gipstein | |
| 3,832,268 A * | 8/1974 | Smith | 428/412 |
| 4,107,354 A | 8/1978 | Wilkenloh et al. | |
| 4,473,665 A | 9/1984 | Martini-Vvedensky et al. | |
| 5,076,959 A | 12/1991 | Barker et al. | |
| 5,084,221 A | 1/1992 | Matsuno et al. | |
| 5,250,577 A | 10/1993 | Welsh | |
| 5,266,605 A | 11/1993 | Welsh | |
| 5,302,634 A | 4/1994 | Mushovic | |
| 5,366,675 A | 11/1994 | Needham | |
| 5,369,147 A | 11/1994 | Mushovic | |
| 5,373,026 A | 12/1994 | Bartz et al. | |
| 5,389,694 A | 2/1995 | Vo et al. | |
| 5,424,021 A | 6/1995 | Nakade et al. | |
| 5,650,106 A | 7/1997 | Paquet et al. | |
| 5,718,841 A | 2/1998 | Mardis et al. | |
| 5,827,362 A | 10/1998 | McLeod | |
| 5,866,053 A | 2/1999 | Park et al. | |
| 5,932,315 A | 8/1999 | Lum et al. | |
| 5,939,475 A | 8/1999 | Reynolds et al. | |
| 6,051,643 A | 4/2000 | Hasegawa et al. | |
| 6,069,183 A | 5/2000 | Wilkes et al. | |
| 6,117,932 A | 9/2000 | Hasegawa et al. | |
| 6,123,798 A | 9/2000 | Gandhi et al. | |
| 6,156,835 A | 12/2000 | Anderson et al. | |
| 6,176,962 B1 | 1/2001 | Soane et al. | |
| 6,268,046 B1 | 7/2001 | Miller et al. | |
| 6,271,297 B1 | 8/2001 | Ishida | |
| 6,342,540 B1 | 1/2002 | Gluck et al. | |
| 6,583,188 B2 | 6/2003 | Chaudhary et al. | |
| 6,602,373 B1 | 8/2003 | McGuire, Jr. | |
| 6,646,072 B2 | 11/2003 | Klendworth et al. | |
| 6,689,823 B1 | 2/2004 | Bellare et al. | |
| 6,696,022 B1 | 2/2004 | Chan et al. | |
| 6,749,934 B2 | 6/2004 | Nagayama et al. | |
| 6,759,446 B2 | 7/2004 | Lee et al. | |
| 7,026,365 B2 | 4/2006 | Lee et al. | |
| 7,122,093 B1 | 10/2006 | Lee et al. | |
| 7,129,287 B1 | 10/2006 | Lee et al. | |
| 7,438,970 B2 * | 10/2008 | Magario et al. | 428/297.4 |
| 2002/0125001 A1 | 9/2002 | Kelly et al. | |
| 2002/0127144 A1 | 9/2002 | Mehta | |
| 2003/0039816 A1 | 2/2003 | Wang et al. | |
| 2003/0134942 A1 * | 7/2003 | Lee et al. | 523/300 |
| 2003/0205832 A1 | 11/2003 | Lee et al. | |
| 2004/0197793 A1 | 10/2004 | Hassibi et al. | |
| 2004/0241315 A1 | 12/2004 | Pui et al. | |
| 2005/0004243 A1 | 1/2005 | Lee et al. | |
| 2005/0266162 A1 * | 12/2005 | Luo et al. | 427/180 |
| 2006/0252869 A1 * | 11/2006 | Twardowska-Baxter et al. | 524/445 |
| 2007/0117873 A1 | 5/2007 | Lee et al. | |
| 2007/0179206 A1 | 8/2007 | Miller et al. | |
| 2008/0248575 A1 | 10/2008 | Lee et al. | |

FOREIGN PATENT DOCUMENTS

| | | | |
|---|---|---|---|
| EP | 1941537 A2 | | 7/2008 |
| JP | 2003012939 | * | 1/2003 |
| WO | 00/15701 A1 | | 3/2000 |
| WO | 00/75275 A2 | | 12/2000 |
| WO | 01/26812 A1 | | 4/2001 |
| WO | 01/86154 A1 | | 11/2001 |
| WO | 2004/065461 A2 | | 8/2004 |
| WO | 2004/074357 A1 | | 9/2004 |
| WO | 2007/053802 A2 | | 5/2007 |

OTHER PUBLICATIONS

Albouy, A. et al., Development of HFC Blowing Agents. Part II: Expanded Polystyrene Insulating Boards, Cellular Polymers, 17(3), pp. 163-176, 1998. Almanza, O. et al., Measurement of the thermal diffusivity and specific heat capacity of polyethylene foams using the transient plane source technique, Polymer International, 53, pp. 2038-2044, 2004.

Almanza, O.A. et al., Prediction of the Radiation Tem in the Thermal Conductivity of Crosslinked Closed Cell Polyolefin Foams, Journal of Polymer Science: Part B: Polymer Physics, 38, pp. 993-1004, 2000.

Crevecoeur, JJ. et al., Water expandable polystyrene (WEPS) Part 1. Strategy and procedures, Polymer, 40, pp. 3685-3689, 1999.

Crevecoeur, JJ. et al., Water expandable polystyrene (WEPS) Part 2. In-situ synthesis of (block)copolymer surfactants, Polymer, 40, pp. 3691-3696, 1999.

Crevecoeur, JJ. et al., Water expandable polystyrene (WEPS) Part 3. Expansion behaviour, Polymer, 40, pp. 3697-3702, 1999.

Daigneault, L.E. et al., Blends of $CO_2$ and 2-Ethyl Hexanol as (Continued)

*Primary Examiner* — David W Wu
*Assistant Examiner* — Marie Reddick
(74) *Attorney, Agent, or Firm* — Standley Law Group LLP

(57) ABSTRACT

A composite material having polymeric resin with disperse phases of reinforcing fibers and nanoparticle materials and its manufacture is disclosed herein. The nanoparticles may be bound together and added to the polymeric resin as microscale aggregations, and then unbound to create a disperse phase of nanoparticles in the resin. In other embodiments, the nanoparticles may be bound to a substrate, such as long fibers, and added to a polymeric resin. The nanoparticles are then unbound from the substrate and dispersed throughout the polymeric resin. The polymeric resin may have multiple components where one component may control the dispersion of the nanoparticles.

14 Claims, 2 Drawing Sheets

OTHER PUBLICATIONS

Replacement Foaming Agents for Extruded Polystyrene, Journal of Cellular Plastics, 37, pp. 262-272, May 2001.
Gibson, L.J. et al., Thermal, electrical and acoustic properties of foams, Cellular Solids, Chapter 7, pp. 283-308, 1999, Cambridge University Press.
Glicksman, Heat transfer in foams, Low Density Cellular Plastics, Chapter 5, pp. 104-152, 1994, Chapman & Hall, New York.
Li, R.H. et al., Poly (vinyl alcohol) synthetic polymer foams as scaffolds for cell encapsulation, J. Biomater. Sci. Polymer Edn, 9(3), pp. 239-258, 1998.
Pallay, J. et al., Expansion of polystyrene using water as the blowing agent, Macromol. Mater. Eng., 275, pp. 18-25, 2000.
Pallay, J. et al., Expansion of Polystyrene using Water as the Blowing Agent, Journal of Cellular Plastics, 43, pp. 371-383, Jul./Sep. 2007.
Pallay, J. et al., Water-blown Expandable Polystyrene. Improvement of the Compatibility of the Water Carrier with the Polystyrene Matrix by In Situ Grafting, Part I. Mechanism of free radical grafting, Cellular Polymers, 21(1), pp. 1-18, 2002.
Pallay, J. et al., Water-Blown Expandable Polystyrene. Improvement of the Compatibility of the Water Carrier with the Polystyrene Matrix by In Situ Grafting, Part II. Influence of compatibilization on the foam quality, Cellular Polymers, 21(1), pp. 19-33, 2002.
Shen, J. et al., Synthesis and foaming of water expandable polystyrene-clay nanocomposites, Polymer, 47, pp. 6303-6310, 2006.
Vo, C.V. et al., An Evaluation of the Thermal Conductivity of Extruded Polystyrene Foam Blown with HFC-134A or HCFC-142b, Journal of Cellular Plastics, 40, pp. 205-228, May 2004.
Wake, M.C. et al., Fabrication of Pliable Biodegradable Polymer Foams to Engineer Soft Tissues, Cell Transplantation, 5(4), pp. 465-473, 1996.
Yin, L.H. et al., Results of Retroviral and Adenoviral Approaches to Cancer Gene Therapy, Stem Cells, 16(suppl 1), pp. 247-250, 1998.
Ajavon, A-L. N. et al., United Nations Environment Programme. http://www.unep.org/ozone/sap2002.shtml, 41 pp. 2002.
Alcantar, N. A. et al., Polyethylene glycol-coated biocompatible surfaces, J. Biomed. Mater. Res. 51(3), pp. 343-351, 2000.
Alexandre, M. et al., Polymer-layered silicate nanocomposites: preparation, properties and uses of a new class of materials, Materials Science and Engineering, 28, pp. 1-63, 2000.
Balazs, A.C. et al., Modeling the Interactions Between Polymers and Clay Surfaces through Self-Consistent Field Theory, Macromolecules 31(23), pp. 8370-8381, 1998.
Baldwin, D.F. et al., Microcellular Poly(ethylene terephthalate) and Crystallizable Poly(ethylene terephthalate): Characterization of Process Variables, Annual Technical Conference—Society of Plastics Engineers, 50(1), pp. 1503-1507, 1992.
Bandyopadhyay, S. et al., Thermal and Thermo-Mechanical Properties of PMMA Nanocomposites, Polymeric Materials Science and Engineering, 75, pp. 208-209, 2000.
Barlow, C. et al., Impact Strength of High Density Solid-State Microcellular Polycarbonate Foams, Journal of Engineering Materials and Technology, 123, pp. 229-233, 2001.
Becker, H. et al., Polymer microfabrication methods for microfluidic analytical applications, Electrophoresis 21, pp. 12-26, 2000.
Biasci, L. et al., Functionalization of montmorillonite by methyl methacrylate polymers containing side-chain ammonium cations, Polymer 35(15), pp. 3296-3304, 1994.
Blumstein, A. et al., Polymerization of Adsorbed Monolayers. I. Preparation of the Clay-Polymer Complex, Journal of Polymer Science: Part A 3, pp. 2653-2664, 1965.
Bouma, R. et al., Foam Stability Related to Polymer Permeability. I. Low Molecular Weight Additives, Journal of Applied Polymer Science, 65, pp. 2679-2689, 1997.
Brown, J.M. et al., Thermoset-Layered Silicate Nanocomposites. Quaternary Ammonium Montmorillonite with Primary Diamine Cured Epoxies, Chem. Mater. 12(11), pp. 3376-3384, 2000.
Cao, X. et al, Polyeurethane/Clay Nanocomposites Foams: Processing, Structure, and Properties, Polymer, 46, pp. 775-783, 2005.
Capecchi, M., High Efficiency Transformation by Direct Microinjection of DNA into Cultured Mammalian Cells, Cell, 22, pp. 479-488, 1980.
Champagne, M. et al., Polymer Blending Technology in Foam Processing, R. Gendron, Editor, CRC Press LLC, Boca Raton, pp. 105-139, 2005.
Chen, J-H. et al., Surface Modification by a Two-Phase Deposition of a Surfactant, Journal of Colloid and Interface Science 142(2), pp. 544-553, 1991.
Chen, L. et al., Effect of Filler Size on Cell Nucleation during Foaming Process, ANTEC, pp. 1732-1736, 2001.
Chen, L. et al., Shear Stress Nucleation in Microcellular Foaming Process, Polymer Engineering and Science, 42 (6), pp. 1151-1158, 2002.
Cho, J.W. et al., Nylon 6 Nanocomposites by Melt Compounding, Polymer 42, pp. 1083-1094, 2001.
Cody, C.A. et al., Studies of Fundamental Organoclay Rheological Relationships, NLGI Spokesman, pp. 437-447, Jan. 1986.
Collias, D.I. et al. Impact Behavior of Microcellular Foams of Polystyrene and Styrene-Acrylonitrile Copolymer, and Single-Edge-Notched Tensile Toughness of Microcellular Foams of Polystyrene, Styrene-Acrylonitrile Copolymer, and Polycarbonate, Polymer Engineering and Science, 35(14), pp. 1178-1182, 1995.
Collias, D.I. et al., Tensile Toughness of Microcellular Foams of Polystyrene, Styrene-Acrylonitrile Copolymer, and Polycarbonate, and the Effect of Dissolved Gas on the Tensile Toughness of the Same Polymer Matrices and Microcellular Foams Polymer Engineering and Science, 35, pp. 1167-1177, 1995.
Colton, J. et al., The Nucleation of Microcellular Thermoplastic Foam With Additives: Part I: Theoretical Considerations, Polymer Engineering and Science, 27(7), 485-492, 1987.
Colton, J. et al., Nucleation of Microcellular Foam: Theory and Practice, Polymer Engineering and Science, 27(7), 500-503, 1987.
Colton, J.S. et al., The Nucleation of Mircrocellular Thermoplastic Foam With Additives: Part II: Experimental Results and Discussion, Polymer Engineering and Science, 27 (7), pp. 493-499, 1987.
Condo, P. et al., Glass Transitions of Polymers with Compressed Fluid Diluents: Type II and III Behavior, Macromolecules 27, pp. 365-371, 1994.
Cooper, A.I. , Polymer synthesis and processing using supercritical carbon dioxide, J. Mater. Chem. 10(2), pp. 207-234, 2000.
Coulberson, A. et al., Gene packaging with lipids, peptides and viruses inhibits transfection by electroporation in vitro, Journal of Controlled Release, 86, pp. 361-370, 2003.
Di, Y. et al., Poly(Lactic) Acid/Organoclay Nanocomposites: Thermal, Rheological Properties and Foam Processing, Journal of Polymer Science, Part B: Polymer Physics, 43(6), pp. 689-698, 2005.
Di Maio, E. et al., Heterogeneous Bubble Nucleation in PCL/Clay Nanocomposite Foams, Plastics, Rubber and Composites, 32, pp. 313-317, 2003.
Dietsche, F. et al., Thermal properties and flammability of acrylic nanocomposites based upon organophilic layered silicates, Polymer Bulletin 43, pp. 395-402, 1999.
Dietsche, F. et al., Translucent Acrylic Nanocomposites Containing Anisotropic Laminated Nanoparticles Derived from Intercalated Layered Silicates, Journal of Applied Polymer Science 75, pp. 396-405, 2000.
Doh, J.G. et al., Synthesis and properties of polystyrene-organoammonium montmorillonite hybrid, Polymer Bulletin 41, pp. 511-518, 1998.
Doroudiani, S. et al., Characterization of Microcellular Foamed HDPE/PP Blends, ANTEC, pp. 1914-1919, 1996.
Doroudiani, S. et al., Processing and Characterization of Microcellular Foamed High-Density Polyethylene/Isotactic Polypropylene Blend, Polymer Engineering and Science. 38 (7), pp. 1205-1215, 1998.
Dournel, P. et al., Analysis of the Evolution of PIR Foams in the Context of the Phase Our of HCFCs*, Journal of Cellular Plastics, 39, pp. 211-227, 2003.
Dreuth, H. et al., A method for local application of thin organic adhesive films on micropatterned structures, Materials Science and Engineering, C5, pp. 227-231, 1998.
Elkovitch, M. et al., Supercritical Carbon Dioxide Assisted Blending of Polystyrene and Poly(Methyl Methyacrylate), Polymer Engineering and Science. 39(10), pp. 2075-2084, 1999.

Faridi, N. et al., Use of Polyolefin Additives in Inert Gas Extrusion Foaming of Polystyrene, ANTEC, pp. 1987-1990, 2000.
Fletcher, N. et al., Size Effect in Heterogeneous Nucleation, Journal of Chemical Physics, 29(3), pp. 572-576, 1958.
Fu, X. et al., Polymer-clay nanocomposites: exfoliation of organophilic montmorillonite nanolayers in polystyrene, Polymer 42, pp. 807-813, 2001.
Fujimoto, Y. et al., Well-Controlled Biodegradable Nanocomposite Foams: From Microcellular to Nanocellular, Macromol. Rapid Commun., 24, pp. 457-461, 2003.
Gabriel, B. et al., Direct Observation in the Millisecond time Range of Fluorescent Molecule Asymmetrical Interaction with the Electropermeabilized Cell Membrane, Biophysical Society. 73, pp. 2630-2637, 1997.
Gehl, J., Electroporation: theory and methods, perspectives for drug delivery, gene therapy and research, Acta Physiol Scand, 177, pp. 437-447, 2003.
Giannelis, E.P., Polymer Layered Silicate Nanocomposites, Advanced Materials 8(1), pp. 29-35, 1996.
Gilman, J.W., Flammability and thermal stability studies of polymer layered-silicate (clay) nanocomposites, Applied Clay Science 15, pp. 31-49, 1999.
Gilman, J.W. et al., Flammability Properties of Polymer-Layered-Silicate Nanocomposites. Polypropylene and Polystyrene Nanocomposites, Chem. Mater. 12(7), pp. 1866-1873, 2000.
Ginzburg, V.V. et al., Calculating Phase Diagrams of Polymer-Platelet Mixtures Using Density Functional Theory: Implications for Polymer/Clay Composites, Macromolecules 32(17), pp. 5681-5688, 1999.
Ginzburg, V.V. et al., Theoretical Phase Diagrams of Polymer/Clay Composites: The Role of Grafted Organic Modifiers, Macromolecules 33(3), pp. 1089-1099, 2000.
Glasgow, I.K. et al., Design Rules for Polyimide Solvent Bonding, Sensors and Materials 11(5), pp. 269-278, 1999.
Kwang, C. et al., Rheology of Molten Polystyrene with Dissolved Supercrticial and Near-Critical Gases, Journal of Polymer Science: Part B: Polymer Physics, 37, pp. 2771-2781, 1999.
Laaksonen, A. et al., Nucleation: Measurements, Theory, and Atmospheric Applications, Annu. Rev. Phys. Chem., 46, pp. 489-524, 1995.
Lan, T. et al., Clay-Reinforced Epoxy Nanocomposites, Chem. Mater. 6(12), pp. 2216-2219, 1994.
Lan, T. et al., On the Nature of Polyimide-Clay Hybrid Composites, Chem. Mater. 6(5), pp. 573-575, 1994.
Lan, T. et al., Mechanism of Clay Tactoid Exfoliation in Epoxy-Clay Nanocomposites, Chem. Mater. 7(11), pp. 2144-2150, 1995.
Lee, D.C. et al., Preparation and Characterization of PMMA-Clay Hybrid Composite by Emulsion Polymerization, Journal of Applied Polymer Science 61, pp. 1117-1122, 1996.
Lee, L.J. et al., Polymer Nanocomposite Foams Prepared by Supercritical Fluid Foaming Technology, 6 pages, unpublished.
Lee, L.J. et al., Design and Fabrication of CD-Like Microfluidic Platforms for Diagnostics: Polymer-Based Microfabrication, Biomedical Microdevices 3:44, pp. 339-351, 2001.
Lee, L.J. et al., Polymer Nanocomposite Foams, Composites Science and Technology, 65, pp. 2344-2363, 2005.
Lee, M. et al., On-Line Measurement of PC/CO2 Solution Viscosities, ANTEC, pp. 1991-1995, 1997.
Lee, M. et al., Measurements and Modeling of PS/Supercrtical CO2 Solution Viscosities, Polymer Engineering and Science, 39(1), pp. 99-109, 1999.
Ren, J. et al., Linear Viscoelasticity of Disordered Polystyrene-Polyisoprene Block Copolymer Based Layered-Silicate Nanocomposites, Macromolecules 33(10), pp. 3739-3746, 2000.
Rodriguez-Perez, M. et al., Effect of Addition of EVA on the Technical Properties of Extruded Foam Profiles of Low-Density Polyethylene/EVA Blends, Journal of Applied Polymer Science, 68, 1237-1244, 1998.
Safadi, B. et al. Multiwalled Carbon Nanotube Polymer Composites: Synthesis and Characterization of Thin Films, Journal of Applied Polymer Science, 84(14), pp. 2660-2669, 2002.

Sandler, J. et al., Development of a Dispersion Process for Carbon Nanotubes in an Epoxy Matrix and the Resulting Electrical Properties, Polymer, 40(21), pp. 5967-5971, 1999.
Sato, Y. et al., Solubilities and Diffusion Coefficients of Carbon Dioxide and Nitrogen in Polypropylene, High-Density Polyethylene, and Polystyrene Under High Pressures and Temperatures, Fluid Phase Equilibria 162, pp. 261-276, 1999.
Schmid, R. et al. Liposome Mediated Gene Transfer into the Rat Oesophagus, Gut, 41, pp. 549-556, 1997.
Seeler, K.A. et al., Tension-Tension Fatigue of Microcellular Polycarbonate: Initial Results, Journal of Reinforced Plastics and Composites, 12, pp. 359-376, 1993.
Shen, J. et al., Nucleation and Reinforcement of Carbon Nanofibers on Polystyrene Nancomposite Foam, unpublished, 5 pages.
Shen, J. et al., Effects of Carbon Nanofibers on Polystyrene Nanocomposites and Foams, ANTEC, pp. 1836-1840, 2004.
Shen, J. et al., Synthesis of Polystyrene-Carbon Nanofibers Nanocomposite Foams, Polymer, 46, pp. 5218-5224, 2005.
Shen, J. et al., Nanoscaled Reinforcement of Polystyrene Foams using Carbon Nanofibers, Journal of Cellular Plastics, 42, pp. 105-126, 2006.
Yamaguchi, M. et al., Pheological Properties and Foam Processability for Blends of Linear and Crosslinked Polyethylenes, Hournal of Polymer Science: Part B: Polymer Physics, 39, pp. 2159-2167, 2001.
Yang, H.H. et al., The Effect of Nucleating Agents on the Foam Extrusion Characteristics, Journal of Applied Polymer Science, 29, pp. 4465-4470, 1984.
Yano, K. et al., Synthesis and Properties of Polyimide-Clay Hybrid, Journal of Polymer Science: Part A: Polymer Chemistry 31, pp. 2493-2498, 1993.
Zeng, C. et al., Poly(methyl methacrylate) and Polystyrene/Clay Nanocomposites Prepared by in-Situ Polymerization, Macromolecules 34(12), pp. 4098-4103, 2001.
Zeng, C. et al., Polymer Layered Silicate Nanocomposites Prepared by A Two-Stage Method, Annual Technical Conference—Society of Plastics Engineers, 59(2), pp. 2213-2217, 2001.
Zeng, C. et al., Structure of Nanocomposite Foams, ANTEC, pp. 1504-1508, 2002.
Zeng, C. et al., Polymer/Clay Nanocomposite Foams Prepared by CO2, Annual Technical Conference—Society of Plastics Engineers, 61(2), pp. 1635-1639, 2003.
Zeng, C. et al., Polymer-Clay Nanocomposite Foams Prepared Using Carbon Dioxide, Advanced Materials, 15(20), pp. 1743-1747, 2003.
Zeng, C. et al., Dynamic silica assembly for fabrication of nanoscale polymer channels, Materials Letters, 59, 3095-3098, 2005.
Zhang, Y. et al., Morphology and Mechanical Properties of Foamed Polyethylene Blends, Cellular Polymers, 22(4), pp. 211-236, 2003.
Zhou, G. et al., Long Fibers and Nanoparticles Reinforced Epoxy and Phenolic Resins, unpublished, 8 pages.
Magauran, E.D. et al., Effective Utilization of Organoclay Dispersants, NLGI Spokesman, pp. 453-460, Mar. 1987.
Marshalli, E., Gene therapy death prompts review of adenovirus vector, 286, pp. 2244-2245, 1999.
Matsuyama, H. et al., Effect of organic solvents on membrane formation by phase separation with supercritical CO2, Journal of Membrane Science, 2004, pp. 81-87, 2002.
Matuana, L.M. et al., Structures and Mechanical Properties of Microcellular Foamed Polyvinyl Chloride, Celluar Polymers 17 (1), pp. 1-16, 1998.
Matuana, L.M. et al., Cell Morphology and Property Relationships of Microcellular Foamed PVC/Wood-Fiber Composites, Polymer Engineering and Science, 38(11), pp. 1862-1872, 1998.
Messersmith, P.B. et al., Synthesis and Characterization of Layered Silicate-Epoxy Nanocomposites, Chem. Mater. 6(10), pp. 1719-1725, 1994.
Messersmith, P.B. et al., Synthesis and Barrier Properties of Poly(ε-Caprolactone)-Layered Silicate Nanocomposites, Journal of Polymer Science: Part A: Polymer Chemistry 33, pp. 1047-1057, 1995.
Mir, L. M., et al., Electric Pulse-Mediated Gene Delivery to Various Animal Tissues, Journal of Advanced Genetics, 54, pp. 83-113, 2005.
Mitchell, C. et al., Dispersion of Functionalized carbon nanotubes in polystyrene, Macromolecules, 35(23), pp. 8825-8830, 2002.

Mitsunaga, M. et al., Intercalated Polycarbonate/Clay Nanocomposites: Nanostructure Control and Foam Processing. Macromolecular Materials and Engineering, 288(7), pp. 543-548, 2003.

Naguib, H.E. et al., Effects of Blending of Branched and Linear Polypropylene Materials on the Foamability, ANTEC, pp. 1623-1627, 2001.

Nam, P.H. et al., Foam Processing and Cellular Structure of PP/Clay Nanocomposites, Proceedings of the First World Conference on Nanocomposites, Chicago, IL, 7 pages, 2001.

Nam, P. et al., Foam Processing and cellular Structure of Polypropylene/Clay Nanocomposites, Polymer Engineering and Science, 42(9), pp. 1907-1918, 2002.

Noh, M.W. et al., Synthesis and characterization of PS-clay nanocomposite by emulsion polymerization, Polymer Bulletin 42, pp. 619-626, 1999.

Okada, A. et al., The chemistry of polymer-clay hybrids, Materials Science and Engineering C3, pp. 109-115, 1995.

Okamoto, M. et al., Synthesis and structure of smectic clay/poly(methyl methacrylate) and clay/polystyrene nanocomposites via in situ intercalative polymerization, Polymer 41, pp. 3887-3890, 2000.

Okamoto, M. et al., A House of Cards Structure in Polypropylene/Clay Nanocomposites Under Elongational Flow, Nano Letters, 1(6), pp. 295-298, 2001.

Okamoto, M. et al., Biaxial Flow-Induced Alignment of Silicate Layers in Polypropylene/Clay Nanocomposite Foam, Nano Letters, 1(9), 503-505, 2001.

Olphen, H.V., Clay-Organic Complexes and The Retention of Hydrocarbons by Source Rocks, An Introduction to Clay Colloid Chemistry; John Wiley & Sons: New York, pp. 307-317, 1963.

Park, C. et al., Effect of the Pressure Drop Rate on Cell Nucleation in Continuous Processing of Microcellular Polymers, Polymer Engineering and Science, 35, pp. 432-440, 1995.

Park, C.B. et al., Rapid Polymer/Gas Solution Formation for Continuous Production of Microcellular Plastics, Journal of Manufacturing Science and Engineering, 118, pp. 639-645, 1996.

Park, C.B. et al., The Effect of Talc on Cell Nucleation in Extrusion Foam Processing of Polypropylene with CO2 and Isopentane, Cellular Polymers, 17(4), pp. 221-251, 1998.

Park, C.P., Foam Extrusion of Syndiotactic Polupropylene-Polyethylene Blends, ANTEC, pp. 1650-1654, 2001.

Pecora, R., DNA: A model compound for solution studies of macromolecules, Science, 251(4996), pp. 893-898, 1991.

Perkins, T. et al., Single polymer dynamics in a elongational flow, Science, 276(5321), pp. 2016-2021, 1997.

Pinnavaia, T.J. et al., Clay-Reinforced Epoxy Nanocomposites: Synthesis, Properties, and Mechanism of Formation, ACS Symp. Ser. 622, pp. 250-261, 1996.

Porter, D. et al., Nanocomposite Fire Retardants—A Review, Fire and Materials 24, pp. 45-52, 2000.

Qian, D. et al., Load transfer and deformation mechanisms in carbon nanotube-polystyrene composites, Applied Physics Letters, 76(20), pp. 2868-2870, 2000.

Ramesh, N. et al., The Heterogeneous Nucleation of Microcellular Foams Assisted by the Survival of Microvoides in Polymers Containing Low Glass Transition Particles. Part I: Mathematical Modeling and Numerical Simulation, Polymer Engineering and Science, 34(22), pp. 1685-1697, 1994.

Ramesh, N. et al., The Heterogeneous Nucleation of Microcellular Foams Assisted by the Survival of Microvoides in Polymers Containing Low Glass Transition Particles. Part II: Experimental Results and Discussion, Polymer Engineering and Science, 34(22), pp. 1698-1706, 1994.

Ramesh, N.S., Foam Growth in Polymers, Foam Extrusion: Principles and Practice, S.-T. Editor, Technomic: Lancaster, Basel, pp. 125-144, 2000.

Ray, S.S. et al., New Polylactide/Layered Silicate Nanocomposites, 6a Melt Rheology and Foam Processing, Macromolecular Materials and Engineering, 288(12), pp. 936-944, 2003.

Reichelt, N. et al., PP-Blends with Tailored Foamability and Mechanical Properties, Cellular Polymers, 22(5), pp. 315-326, 2003.

Shi, H. et al., Interfacial Effects on the Reinforcement Properties of Polymer-Organoclay Nanocomposites, Chem. Mater. 8(8), pp. 1584-1587, 1996.

Siripurapu, S., et al., Generation of Microcellular Foams of PVDF and its Blends Using Supercritical Carbon Dioxide in a Continuous Process, Polymer, 43, pp. 5511-5520, 2002.

Siripurapu, S. et al., Low-Temperature, Surface-Mediated Foaming of Polymer Films, Advanced Materials (Weinheim, Germany), 16(12), pp. 989-994, 2004.

Siripurapu, S. et al., Controlled Foaming of Polymer Films Through Restricted Surface Diffusion and the Addition of Nanosilica Particles or CO2-Philic Surfactants, Macromolecules, 38, pp. 2271-2280, 2005.

Slabaugh, Heats of Immersion and Swelling of Organoclay Complexes, 29(3), pp. 586-589, 1969.

Solomon, D.H. et al., Reactions Catalyzed by Minerals. Part I. Polymerization of Styrene, Journal of Applied Polymer Science 9, pp. 1261-1271, 1965.

Solomon, D.H. et al., Reactions Catalyzed by Minerals. Part III. The Mechanism of Spontaneous Interlamellar Polymerizations in Aluminosilicates, Journal of Applied Polymer Science 12, pp. 1253-1262, 1968.

Spitael, C. et al., Block Copolymer Micelles for Nucleation of Microcellular Thermoplastic Foams. Macromolecules, 37(18), pp. 6874-6882, 2004.

Stafford, C.M. et al., Expansion of Polystyrene Using Supercriticial Carbon Dioxide: Effects of Molecular Weight, Polydispersity, and Lower Molecular Weight Components, Macromolecules, 32(22), pp. 7610-7616, 1999.

Strauss, W. et al., Supercritical CO2 Processed Polystyrene Nanocomposite Foams, Journal of Cellular Plastics, 43(3), pp. 229-241, 2004.

Tekle, E., et al., Electroporation by Using Bipolar Oscillating Electric Field: An Improved Method for DNA Transfection of NIH 3T3 Cells, Proc. Natl. Acad. Sci. USA, 88, pp. 4230-4234, 1991.

Tomasko, D. et al., Supercritical Fluid Applications in Polymer Nanocomposites, Current Opinion in Solid State & Materials Science, 7, pp. 407-412, 2003.

Tomasko, D.L. et al., A Review of CO2 Applications in the Processing of Polymers, Ind. Eng. Chem. Res. 42 (25), pp. 6431-6456, 2003.

Usuki, A. et al., Swelling behavior of montmorillonite cation exchanged for ω-amino acids by ε-caprolactam, J. Mater. Res. 8(5), pp. 1174-1178, 1993.

Usuki, A. et al., Synthesis of nylon 6-clay Hybrid, J. Mater. Res. 8(5), pp. 1179-1184, 1993.

Vaia, R.A. et al., Kinetics of Polymer Melt Intercalation, Macromolecules 28(24), pp. 8080-8085, 1995.

Vaia, R.A. et al., Microstructural Evolution of Melt Intercalated Polymer-Organically Modified Layered Silicates Nanocomposites, Chem. Mater. 8(11), pp. 2628-2635, 1996.

Vaia, R.A. et al., Lattice Model of Polymer Melt Intercalation in Organically-Modified Layered Silicates, Macromolecules 30(25), pp. 7990-7999, 1997.

Vaia, R.A. et al., Polymer Melt Intercalation in Organically-Modified Layered Silicates: Model Predictions and Experiment, Macromolecules 30(25), pp. 8000-8009, 1997.

Vaia, R. et al., Polymer Nanocomposites Status and Opportunities, MRS Bull. 26, pp. 394-401, 2001.

Walker, T.A. et al., Multicomponent Polymer Systems in the Presence of Supercriticial Carbon Dioxide, Polymeric Materials: Science and Engineering, 84, pp. 203, 2001.

Wan, C. et al., Extrusion Foaming of PET/PP Blends SPE-ANTEC, 3, pp. 2786-2790, 2001.

Wang, M.S. et al., Clay-Polymer Nanocomposites Formed from Acidic Derivatives of Montmorillonite and an Epoxy Resin, Chem. Mater. 6(4), pp. 468-474, 1994.

Wang, S. et al., Polymeric Nanonozzle Array Fabricated by Sacrificial Template Imprinting, Advanced Materials, 17, pp. 1182-1186, 2005.

Wang, Z. et al., Hybrid Organic-Inorganic Nanocomposites: Exfoliation of Magadiite Nanolayers in an Elastomeric Epoxy Polymer, Chem. Mater. 10(7), pp. 1820-1826, 1998.

Weimer, M.W. et al., Direct Synthesis of Dispersed Nanocomposites by in Situ Living Free Radical Polymerization Using a Silicate-Anchored Initiator, J. Am. Chem. Soc. 121(7), pp. 1615-1616, 1999.

Winter, H. et al., Rigid Pore Structure from Highly Swollen Polymer Gels, Macromolecules, 35(9), pp. 3325-3327, 2002.

Wissinger, R. et al., Swelling and Sorption in Polymer-CO2 Mixtures at Elevated Pressures, Journal of Polymer Science: Part B: Polymer Physics, 25, pp. 2497-2510, 1987.

Zhu, J. et al., Improving the Dispersion and Integration of Single-Walled Carbon Nanotubes in Epoxy Composites through Functionalization, Nano Letters, 3(8), pp. 1107-1113, 2003.

Zhulina, E. et al., Attraction between Surfaces in a Polymer Melt Containing Telechelic Chains: Guidelines for Controlling the Surface Separation in Intercalated Polymer-Clay Composites, Langmuir, 15(11), pp. 3935-3943, 1999.

Goel, S. et al., Generation of Microcellular Polymeric Foams Using Supercritical Carbon Dioxide. I: Effect of Pressure and Temperature on Nucleation, Polymer Engineering and Science, 34, pp. 1137-1147, 1994.

Gong, X. et al., Surfactant-assisted processing of carbon nanotube/polymer composites, Chemistry of Materials, 12 (4), p. 1049-1052, 2000.

Gordon, J. et al., Genetic transformation of mouse embryis by microinjection of purified DNA, Proc. Natl. Acad. Sci. USA, 78, pp. 6376-6380, 1980.

Gore, M., Adverse effects of gene therapy: gene therapy can cause leukemia: no shock, mild horror but a probe, Gene Therapy, 10(4-4), 1 page, 2003.

Hill, D. et al., Functionalization of carbon nanotubes with polystyrene, Macromolecules, 35(25), pp. 9466-9471, 2002.

Han, C.D. et al., A Study of Foam Extrusion Using a Chemical Blowing Agent, Journal of Applied Polymer Science, 20, pp. 1583-1595, 1976.

Han, J. et al., Bubble Nucleation in Polymeric Liquids. II. Theoretical Considerations, Journal of Polymer Science: Part B: Polymer Physics, 28, 743-761, 1990.

Han, R. et al., Immunization of rabbits with cottontail rabbit papillomavirus E1 and E2 genes: protective immunity induced by gene gun-mediated intracutaneous delivery but not by intramuscular injection, Vaccine, 18, pp. 2937-2944, 2000.

Han X. et al., Extrusion of Polystyrene Microcellular Foam with Supercritical CO2, ANTEC, pp. 1857-1861, 2000.

Han, X. et al., Process Optimization in Microcellular Foam Extrusion, ANTEC, pp. 1741-1745, 2001.

Han, X. et al,. Continuous Microcellular Polystyrene Foam Extrusion with Supercritical CO2, Polymer Engineering and Science. 42(11), pp. 2094-2106, 2002.

Han, X. et al., Influences of Solubility and Viscosity in the Polystyrene/CO2 Microcellular Foaming Extrusion, ANTEC, pp. 1910-1914, 2002.

Han, X. et al., Processing and Cell Structure of Nano-Clay Modified Microcellular Foams, ANTEC, pp. 1915-1919, 2002.

Han, X. et al., Extrusion of Polystyrene Nanocomposite Foams With Supercritical CO2, Polymer Engineering and Science, 43(6), pp. 1261-1275, 2003.

Han, X. et al., Co2 Foaming Based on Polystyrene/Poly(methyl Methacrylate) Blend and Nanoclay, Polymer Engineering and Science, pp. 103-111, 2007.

Huang, X. et al., Synthesis of a PMMA-Layered Silicate Nanocomposite by Suspension Polymerization, Polymer Preprints, (Am. Chem. Soc., Div. Polym. Chem.) 41(1), p. 521, 2000.

Jacobasch, H.J. et al., Wetting of Solids by Liquids With Low and High Viscosity, Progr. Colloid Polym. Sci., 105, pp. 44-54, 1997.

Jin, W. et al., An Investigation on the Microcellular Structure of Polystyrene/LCP Blends Prepared by Using Supercritical Carbon Dioxide, Polymer, 42, pp. 8265-8275, 2001.

Kazarian, S. et al., Specific Intermolecular Interaction of Carbon Dioxide with Polymers, American Chemical Society, 118, p. 1729, 1996.

Kazarian, S. Polymers and Supercritical Fluids: Opportunities for Vibrational Spectroscopy, Macromol. Symp., 184, 215-228, 2002.

Khemani, K.C. et al., Polymeric Foams: An Overview, Science and Technology, ACS Symposium Series, Washington, D.C., 669, pp. 1-7, 1997.

Khine, M. et al. A Single Cell Electroporation Chip, The Royal Society of Chemistry, pp. 38-43, 2005.

Kiran, E. et al., Modeling Polyethylene Solutions in Near and Supercritical Fluids Using the Sanchez-Lacombe Model, The Journal of Supercritical Fluids, 6, pp. 193-203, 1993.

Kiszka, M.B. et al., Modeling High-Pressure Gas-Polymer Mixtures Using the Sanchez-Lacombe Equation of State, Journal of Applied Polymer Science, 36, pp. 583-597, 1988.

Knight, J. et al., Hydrodynamic Focusing on a Silicon Chip: Mixing Nanoliters in Microseconds, 80(17), pp. 3863-3866, 1998.

Kojima, Y. et al., Mechanical properties of nylon 6-clay hybrid, J. Mater. Res. 8(5), pp. 1185-189, 1993.

Kumar, V. et al., A Process to Produce Microcellular PVC, Intern. Polymer Processing, VIII (1), pp. 73-80, 1993.

Kumar, V. et al., Producion of Microcellular Polycarbonate Using Carbon Dioxide for Bubble Nucleation, Journal of Engineering for Industry, 116, pp. 413-420, 1994.

Krause, B. et al., Ultralow-K Dielectrics Made by Supercritical Foaming of Thin Polymer Films, Advanced Materials, 14(15), pp. 1041-1046, 2002.

Krause, B. et al., Open Nanoporous Morphologies from Polymeric Blends by Carbon Dioxide Foaming, Macromolecules, 35 (5), pp. 1738-1745, 2002.

Krishnamoorti, R. et al., Structure and Dynamics of Polymer-Layered Silicate Nanocomposites, Chem. Mater. 8 (8), pp. 1728-1734, 1996.

Krishnamoorti, R. et al., Rheology of End-Tethered Polymer Layered Silicate Nanocomposites, Macromolecules 30(14), pp. 4097-4102, 1997.

Krishnamoorti, R. et al., Shear response of layered silicate nanocomposites, Journal of Chemical Physics, 114 (11), pp. 4968-4973, 2001.

Lee, S., Shear Effects on Thermpoplastic Foam Nucleation, Polymer Engineering and Science, 33(7), pp. 418-422, 1993.

Li, H. et al., Effect of Carbon Dioxide on the Interfacial Tension of Polymer Melts, Ind. Eng. Chem. Res., 43, pp. 509-514, 2004.

Liang, Y. et al., Nano-Effect In In Situ Nylon-6 Nanocomposites, Annual Technical Conference—Society of Plastics Engineers, 59(2), pp. 2218-2220, 2001.

Liao, K. et al., Interfacial characteristics of a carbon nanotube-polystyrene composite system, Applied Physics Letters, 78(25), p. 4225-4227, 2001.

Lin, Y. et al, Simulation and Experimental Demonstration of the Electric Field Assisted Electroporation Microchip for in vitro Gene Delivery Enhancement, Lab Chip, 4, pp. 104-108, 2004.

Liu, C. et al., Foaming of Electron-Beam Irradiated LDPE Blends Containing Recycled Polyethylene Foam, Journal of Polymer Research, 11, pp. 149-159, 2004.

* cited by examiner

METHOD OF PREPARING A COMPOSITE WITH DISPERSE LONG FIBERS AND NANOPARTICLES

CROSS-REFERENCE TO RELATED APPLICATION

This is a non-provisional of U.S. Application No. 60/727,723, filed Oct. 18, 2005, which is incorporated herein by reference.

TECHNICAL FIELD

The invention relates generally to plastics reinforced with a combination of long fibers and nanoparticles. More particularly, the invention relates to improvements in the known technology for controlling the dispersion of the nanoparticles in the continuous polymer matrix.

BACKGROUND OF THE INVENTION

Among the various thermoset polymers, epoxy resins provide superior overall performance, such as good mechanical properties, chemical resistance, and low shrinkage. Therefore, epoxy resins are high-performance systems for use in coating, adhesive, civil engineering, structural, electronic and composite applications.

In 1907, phenolic resins were the first thermoset resins to be synthesized commercially. These resins have excellent fire performance, good dimensional stability, excellent thermal insulation properties, and are cost effective. These properties enable phenolics to be used in household appliances, business equipment, wiring devices, automotive electrical systems, and mass transit.

Fiber reinforced plastics (FRPs) are the most widely used composites. In general, fibers are the principal load-carrying members, while the surrounding plastic matrix keeps the fibers in the desired location and orientation, acting as a load transfer medium. The plastic also protects the fibers from environmental damage due to exposure to elevated temperature and humidity. Fiber-reinforced composites have low specific gravity, high internal damping, and high strength-to-weight ratio and modulus-to-weight ratio. There have been numerous applications for FRPs, and additional applications are continually sought, due to the attractive properties. In the FRP art, the terms "long fiber" and "short fiber" are commonly used to designate fibers and will be understood by those of skill in the art.

A "nanocomposite" is a composite containing a disperse material with at least one dimension that is smaller than about 100 nm in size. Due to the nanoscale dispersion and the high aspect ratios of the inorganic clays, polymer-layered silicate nanocomposites (PLSNs) exhibit light weight, dimensional stability, heat resistance, and a certain degree of stiffness, barrier properties, improved toughness and strength with far less reinforcement loading than conventional composite counterparts. The synthesis and characterization of PLSNs has become one of the frontiers in materials science.

Since the discovery of carbon nanotubes (CNTs), many people have studied the properties of polymer-carbon nanotube composites. However, the high cost and low volume of production of the CNT have greatly limited product development and application. Carbon nanofibers (CNF), defined as carbon fibers with diameters of up to 200 nm (and typically in the 100-200 nm range) and lengths of up to about 100 microns, may serve as a substitute for the carbon nanotubes. Recent studies indicate that polymer-carbon nanofiber composites (PCNFCs) have properties similar to polymer-carbon nanotube composites. These CNF nanocomposites can be used to make conductive paints, coatings, films, tubes, sheets, and parts for electrostatic painting, electro-magnetic interference and electro-static discharge applications. In addition, these composites also provide improved strength, stiffness, dimensional stability and thermal conductivity. It makes the PCNFCs a very promising material for a wide range of applications in automotive, aerospace, electronic and chemical industries.

Although fiber-reinforced plastics (FRP) have good mechanical properties, an interface exists between the polymer matrix and the individual fibers. This interface, which represents a substantial area, is subject to diffusive attack by water and other small molecules. This can cause a substantial drop in interfacial strength and failure of adhesion between the components. Under tension, compression, shear, or impact, failure of the polymer matrix may also take place.

A problem continually encountered in preparing nanocomposites has been the difficulty in properly dispersing the nanoparticles in the continuous polymer phase. For example, it is often difficult to load more than about 10 weight % of nanoparticles into the continuous phase. By way of comparison, a highly-loaded FRP can often contain greater than 50 weight % of the disperse fiber phase. Not unexpectedly, the enhancement of mechanical properties of the continuous phase polymer in a typical PLSN or PCNFC is relatively low compared with the enhancement of mechanical properties in a typical FRP. When this is combined with the high cost of the nano-scale material, it would be surprising if nanocomposites would have already made significant market penetration.

It is therefore an object of the present invention to provide a composite material that effectively combines advantages of a disperse fiber phase and a disperse nanoparticle phase.

SUMMARY OF THE INVENTION

This and other objects are achieved by the exemplary embodiments presented in more detail below.

BRIEF DESCRIPTION OF THE DRAWINGS

The invention will be better understood through reference to the exemplary embodiments disclosed herein, wherein identical parts are identified by identical part numbers, and wherein.

DETAILED DESCRIPTION OF A PREFERRED EMBODIMENT

Figure 1:
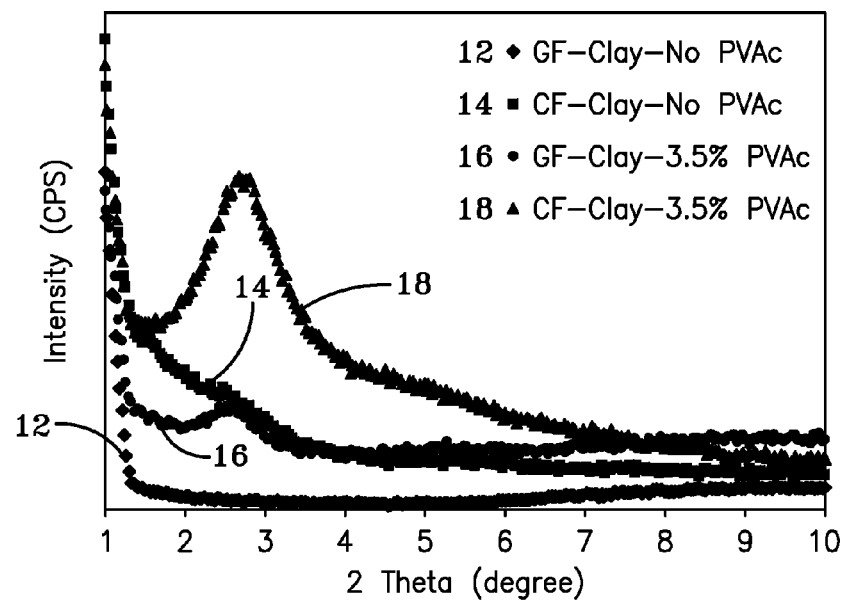
FIG. 1 is an x-ray diffraction pattern showing the effects of adding poly(vinyl acetate) to composites containing long fibers and nanoclays in a continuous phase of unsaturated polyester resin.

In an exemplary embodiment of the invention, the advantages of both FRP and polymer nanocomposites are combined to produce a composite having previously unexpected properties. The composite has a substantially continuous matrix of a polymer, especially a polymer resin, such as an epoxy or a phenolic resin. Two distinct disperse phases are present in a substantially uniform manner in the matrix. The first disperse phase comprises reinforcing fibers, such as are commercially available and are manufactured from glass, carbon or aramid. The second disperse phase comprises nanoclays, carbon nanofibers or carbon nanotubes. As described in more detail below, the polymer matrix will generally comprise a predominant amount of a first, generally hydrophobic, component and an effective amount of a second component, the second component selected to moderate the hydrophobicity of the first component.

Speaking generally, reinforcing fibers, especially long glass or carbon fibers embue the composite with good mechanical properties. Between glass and carbon fibers, the glass fibers are more hydrophilic. The nanoparticles improve the barrier properties and strengthen the matrix between long fibers in order to reduce the matrix failure in the composites and extend the longevity of the composites. Between nanoclays and carbon nanofibers, the nanoclays are more hydrophilic.

To succeed in producing these new composites, two questions need to be answered. How to well disperse nanoparticles into FRPs and whether the resin processability can be maintained with the presence of nanoparticles? Speaking generally, phenolic resins or unsaturated polyester (UP) resins containing poly(vinyl acetate) (PVAc) as a low profile additive are of higher hydrophilicity than the epoxy resins or unsaturated polyester resins lacking the poly(vinyl acetate). Therefore, a variety of combination of these different materials may be selected to control the distribution and dispersion of nanoparticles in the FRP to achieve desirable composite properties and processability.

In an exemplary scheme, raw nanoclay is dispersed easily into the phenolic resin, so a phenolic-clay nanocomposite is synthesized. Then, reinforcing fibers of long glass or carbon fibers are integrated into the phenolic-clay nanocomposite. This step, producing a hybrid composite can be achieved using a known prepreging or resin transfer molding (RTM) process. The hybrid composite obtained has long carbon fibers reinforcing a phenolic matrix having well-dispersed nanoclay. Since the added nanoparticles tend to increase the resin viscosity, especially when good dispersion is achieved at a high loading level of the nanoclay, resin processing may become quite difficult in preparing prepregs for autoclave molding or in RTM mold filling. If the nanoclay dispersion is controlled to initially limit the amount of dispersion, the resin viscosity may remain low enough to facilitate prepreg preparation or RTM mold filling. In such a system, the nanoclays form micro-scale aggregates that are not well dispersed by a binder. After molding, many techniques are useful to exfoliate the nanoclay aggregates. Among these techniques are: elevated temperature to melt the binder, ultrasonic energy, or a combination of both. Ultrasonic energy is also useful in improving the prepreg consolidation. This extra advantage may further improve the product properties.

In a further exemplary scheme, the same approach can be applied to organoclays or CNFs in epoxy resins. In such an instance, the nanoparticles, such as a CNF, are bound to the reinforcing fiber surface, such as a glass surface. After this, a pure resin, such as epoxy, is integrated with the reinforcing fibers though the known prepreg formation or RTM mold filling process, essentially ignoring the presence of the CNF on the reinforcing fiber surface. When curing the composites at elevated temperatures, the binder between the CNF and the reinforcing fibers would melt, with the CNFs diffusing from the reinforcing fiber surface into the epoxy matrix. This is because the CNFs and epoxy resins are hydrophobic, while the glass surface is hydrophilic, so the CNF prefers to diffuse into the more compatible epoxy matrix. This second method has the advantage of using a composite manufacturing process, including prepregs preparation and molding, that is the same as that without any nanoparticles. However, the nanoparticles have to be much more compatible with the matrix resin than with the reinforcing fibers to effect good dispersion. Again, nanoparticle dispersion in the polymer matrix may be enhanced by applying ultrasonic energy.

This second approach is also applicable to a system comprising long carbon fibers and raw clays with more hydrophilic resins, such as phenolics. Mechanical and thermal properties of such composites will be compared with both long fiber-reinforced composites and polymer nanocomposites. Material composition, binder selection, and processing conditions will be optimized to achieve the best properties of the hybrid composites. Rheological measurements, kinetic analysis, permeability measurements, and mold filling observations for resins containing nanoparticles will be carried out to quantify the composite processability during molding and curing. XRD, SEM, and TEM characterizations will also be performed to determine the nanoparticle dispersion in the molded composites.

Attention is now directed to FIG. 1, which presents x-ray diffraction studies of two different systems incorporating the aspects of one of the inventive embodiments. Four distinct traces are illustrated in FIG. 1. In both cases, the polymeric matrix is an unsaturated polyester ("UP"). In the first case, shown as line 12, glass fibers coated with a nanoclay are dispersed in the UP, in the absence of poly(vinyl acetate). The expected diffraction peak for the clay (in the zone between 2 and 3 on the abscissa) is not seen in line 12, indicating that the nanoclay has stayed at the glass fiber surface and has not dispersed into the UP matrix. When the identical system is prepared again, but the polymeric matrix includes 3.5% PVAc, line 16 is obtained, showing the diffraction peak indicative of diffusion of the nanoclay into the polymeric matrix. In a second case, shown as line 14, carbon fibers are coated with the nanoclay and dispersed in the UP, in the absence of poly(vinyl acetate). The expected diffraction peak for the clay is not seen in line 14, indicating that the nanoclay has stayed at the carbon fiber surface and has not dispersed into the UP matrix. When the identical system is prepared again, but the polymeric matrix includes 3.5% PVAc, line 18 is obtained, showing the diffraction peak indicative of diffusion of the nanoclay into the polymeric matrix.

Figures 2A, 2B:
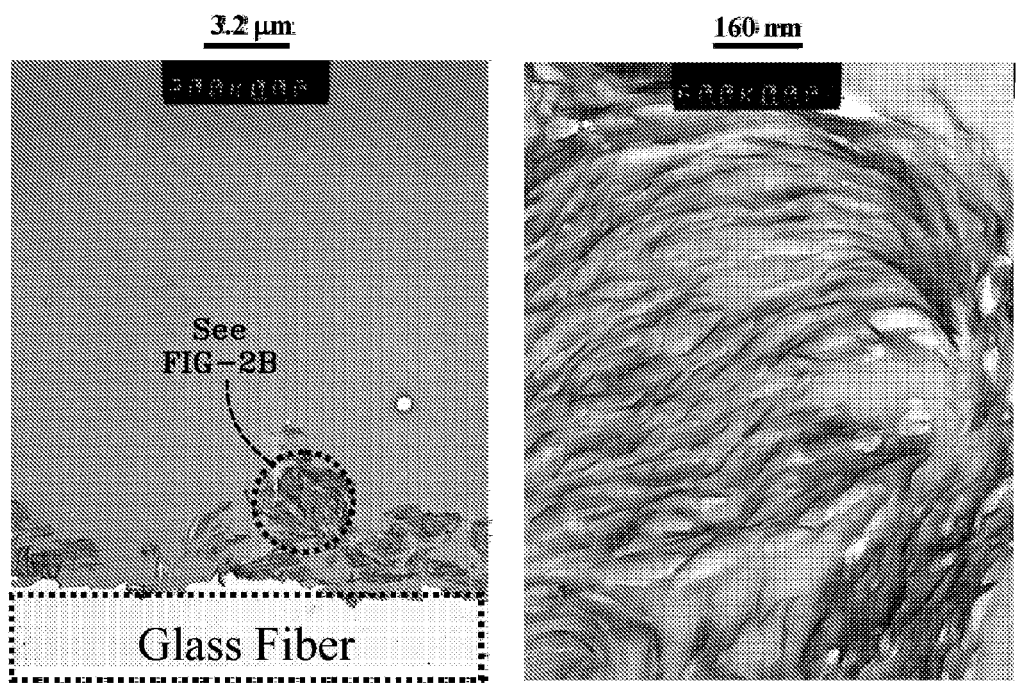
FIGS. 2A, 2B are microphotographs of an unsaturated polyester—nanoclay—long fiber composite material, FIG. 2B being an enlargement of a portion of FIG. 2A.

Further confirmation of this phenomenon is provided in FIGS. 2A and 2B. A photomicrograph of the type of system shown in line 12 of FIG. 1 is presented, with a glass fiber visible near the bottom of FIG. 2A. A bar at the top of FIG. 2A, indicating a length of 3.2 microns, shows the scale of the image. FIG. 2B, which is enlarged from the image of FIG. 2A at the point shown near the glass fiber, demonstrates that the nanoclay particles have stayed near the glass fiber. In FIG. 2B, the bar shows a length of 160 nm, to illustrate scale. This shows that the absence of PVAc in this system may improve the barrier properties of the material, by preventing small molecules, such as water, from diffusing into an interface between the long fibers (glass, in this example) and the polymeric matrix.

Figure 3:
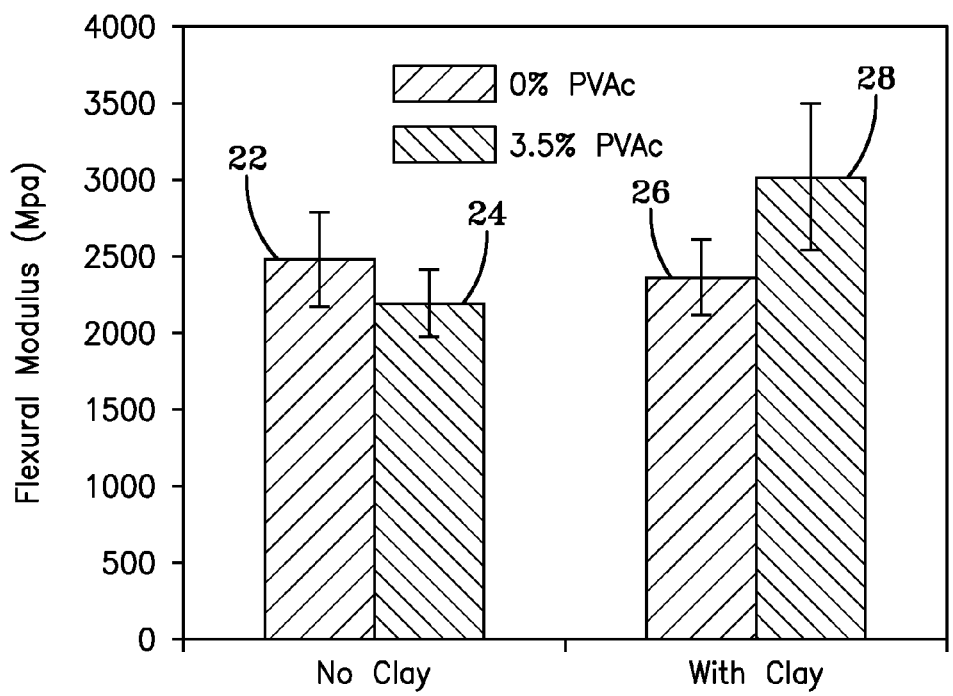
FIG. 3 is a diagram showing the improved flexural modulus obtained by adding poly(vinyl acetate) to an unsaturated polyester—nanoclay—long fiber composite material.

Some further aspects of the UP-glass fiber—nanoclay system are shown in FIG. 3. In a system without nanoclay being present (bars 22 and 24 in FIG. 3), addition of 3.5% PVAc to the system has little effect on the flexural modulus, and, if anything, the flexural modulus is reduced slightly. When clay is added (bars 26 and 28 in FIG. 3), the presence of PVAc markedly improves the flexural modulus, as seen by comparing bars 26 and 28. Comparing systems with or without nanoclay, that is, comparing bar 22 to bar 26 or comparing bar 24 to bar 28, it is readily noted that the presence of nanoclay makes little difference when PVAc is absent, but the addition of nanoclay greatly improves flexural modulus when the PVAc is present in the UP polymer matrix.

Figure 4:
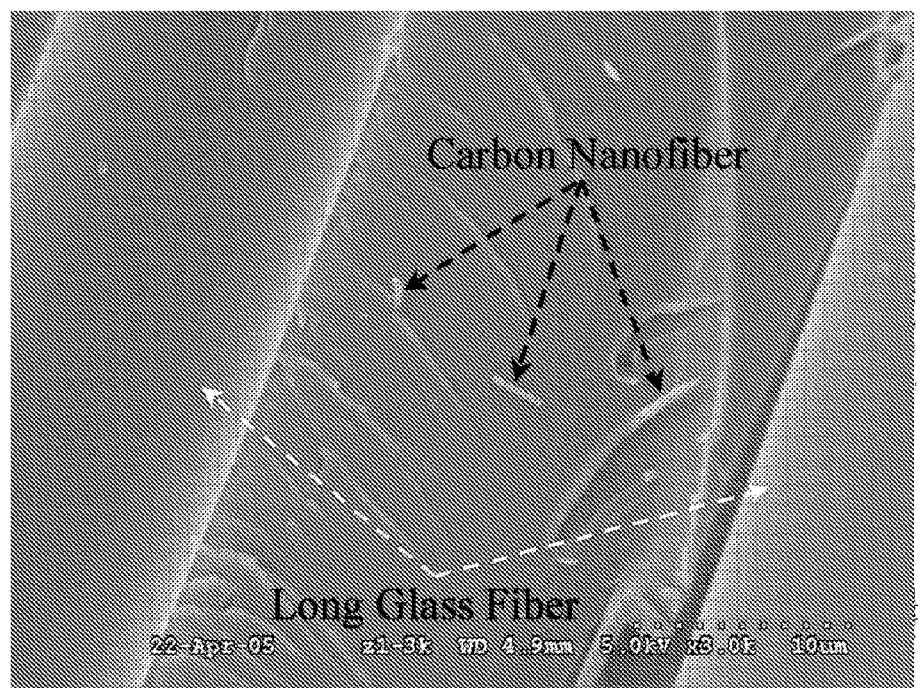
FIG. 4 is a scanning electron microscope image of a phenolic resin—carbon nanofiber—long glass fiber composite.

In another example, a system involving phenolic resin with disperse carbon nanofibers and long glass fibers is demonstrated by way of a scanning electron micrograph presented as FIG. 4. In this system, where a pair of the long glass fibers are shown by arrows, the carbon nanofibers are seen to be well dispersed into the phenolic matrix that acts as the continuous phase.

Other embodiments and uses of the invention will be apparent to those skilled in the art from consideration of the specification and practice of the invention disclosed herein. The specification and examples should be considered exemplary only and do not limit the intended scope of the invention.

What is claimed is:

1. A method of preparing a composite material including nanoparticles and fibers dispersed in a resin, comprising the steps of:
    binding nanoparticles to said fibers;
    adding said fibers having said bound nanoparticles thereon to said resin; and
    unbinding said nanoparticles from said fibers so as to disperse said nanoparticles in said resin.

2. The method of claim 1 wherein said nanoparticles are more compatible with said resin then said fibers.

3. The method of claim 1 wherein said nanoparticles and said resin are hydrophobic.

4. The method of claim 1 wherein said fibers are hydrophilic.

5. The method of claim 1 wherein the unbinding of said nanoparticles from said fibers occurs during curing of said composite.

6. The method of claim 1 wherein said addition of said fibers having said bound nanoparticles is integrated with said resin through the use of pre-impregnation formation.

7. The method of claim 1 wherein said addition of said fibers having said bound nanoparticles is integrated with said resin through the use of resin transfer molding.

8. The method of claim 1 wherein said fibers are reinforcing fibers selected from the group consisting of glass, carbon, aramid, and combinations thereof.

9. The method of claim 1 wherein said nanoparticles are selected from the group consisting of nanoclays, carbon nanofiber, carbon nanotubes, and combinations thereof.

10. The method of claim 1 further comprising applying ultrasonic energy to increase dispersion of said nanoparticles.

11. The method of claim 1 wherein said resin comprises an effective amount of a polymer to selectively control dispersion of said nanoparticles in said resin.

12. A method of preparing a composite material including nanoparticles and fibers dispersed in a resin, comprising the steps of:
    providing a resin, wherein said resin includes poly(vinyl acetate);
    binding said nanoparticles to said fibers;
    adding said fibers having said bound nanoparticles thereon to said resin; and
    unbinding said nanoparticles from said fibers so as to disperse said nanoparticles in said resin.

13. The method of claim 12 wherein poly(vinyl acetate) is present at about 3.5% by weight of said resin.

14. The method of claim 12 wherein said nanoparticles are more compatible with said resin than said fibers.

* * * * *